United States Patent
Brandt et al.

(10) Patent No.: US 10,272,892 B2
(45) Date of Patent: Apr. 30, 2019

(54) HYDRAULIC UNIT FOR PRODUCING BRAKE PRESSURE FOR A MOTOR-VEHICLE BRAKE SYSTEM

(71) Applicant: Continental Teves AG & Co. oHG, Frankfurt (DE)

(72) Inventors: Lothar Brandt, Gifhorn (DE); Mike Cichy, Candler, NC (US); Björn Klein, Frankfurt am Main (DE); Jörg Loke, Brechen (DE); Erkan Sarac, Echzell (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/737,920

(22) PCT Filed: Jun. 23, 2016

(86) PCT No.: PCT/EP2016/064558
§ 371 (c)(1),
(2) Date: Dec. 19, 2017

(87) PCT Pub. No.: WO2017/001282
PCT Pub. Date: Jan. 5, 2017

(65) Prior Publication Data
US 2018/0170336 A1    Jun. 21, 2018

(30) Foreign Application Priority Data

Jun. 30, 2015 (DE) .................. 10 2015 212 254

(51) Int. Cl.
*B60T 11/16* (2006.01)
*B60T 11/20* (2006.01)

(52) U.S. Cl.
CPC .............. *B60T 11/20* (2013.01); *B60T 11/16* (2013.01)

(58) Field of Classification Search
CPC .................................. B60T 11/16; B60T 11/20
(Continued)

(56) References Cited

U.S. PATENT DOCUMENTS 6,936,084 B2    8/2005   Schlensker et al.
9,151,449 B2    10/2015  Sakai
(Continued)

FOREIGN PATENT DOCUMENTS

DE            10052524 A1    4/2002
DE         102004048822 A1   4/2006
(Continued)

OTHER PUBLICATIONS

Jack Erjavec, Automotive Brake, Cengage Learning, 2003, p. 131.*
(Continued)

*Primary Examiner* — F Daniel Lopez
*Assistant Examiner* — Daniel S Collins
(74) *Attorney, Agent, or Firm* — RatnerPrestia

(57) ABSTRACT

A hydraulic unit for producing brake pressure for a hydraulic motor-vehicle brake system, including a main body, a cavity arranged in the main body and having at least one first bore segment with a defined target diameter, in which a cylindrical piston moveable in the axial direction is arranged, which, in the cavity, bounds at least one pressure chamber filled with a hydraulic fluid, for producing brake pressure in a brake circuit, and at least a first and a second sealing element for sealing off the cylindrical piston, which sealing elements are arranged at an axial distance from each other. In order to provide a hydraulic unit that can be produced more effectively and economically while the technical requirements nevertheless remain fulfilled, the material of the main body in a surface layer of an inner wall of the cavity in the bore segment has a material microstructure that is work-hardened.

18 Claims, 1 Drawing Sheet

(58) Field of Classification Search
USPC .......................................................... 60/581
See application file for complete search history.

(56) References Cited

U.S. PATENT DOCUMENTS

| | | | |
|---|---|---|---|
| 2007/0182403 A1 | 8/2007 | von Hayn et al. | |
| 2008/0245719 A1 | 10/2008 | Beard et al. | |
| 2012/0192556 A1* | 8/2012 | Verhagen | B60T 8/38 60/585 |
| 2014/0144732 A1 | 5/2014 | Bayer et al. | |
| 2015/0033839 A1* | 2/2015 | Voigtmann | B60T 7/042 73/129 |

FOREIGN PATENT DOCUMENTS

| | | |
|---|---|---|
| DE | 102012203099 A1 | 11/2012 |
| DE | 102014201699 A1 | 7/2014 |
| WO | 2004089714 A1 | 10/2004 |
| WO | 2012153441 A1 | 11/2012 |
| WO | WO 2013120544 A1 * | 8/2013 ............. B60T 7/042 |

OTHER PUBLICATIONS

International Preliminary Report on Patentability and Written Opinion for International Application No. PCT/EP2016/064558, dated Jan. 2, 2018, 6 pages.
International Search Report and Written Opinion for International Application No. PCT/EP2016/064558, dated Sep. 13, 2016, 7 pages.
International Search Report and Written Opinion for International Application No. PCT/EP2014/064558, dated Jan. 5, 2015, 12 pages.
German Search Report for German Application No. 10 2016 211 268.6, dated May 30, 2017, including partial English translation, 10 pages.

* cited by examiner

HYDRAULIC UNIT FOR PRODUCING BRAKE PRESSURE FOR A MOTOR-VEHICLE BRAKE SYSTEM

CROSS REFERENCE TO RELATED APPLICATIONS

This application is the U.S. National Phase Application of PCT International Application No. PCT/EP2016/064558, filed Jun. 23, 2016, which claims priority to German Patent Application No. 10 2015 212 254.9, filed Jun. 30, 2015, the contents of such applications being incorporated by reference herein.

FIELD OF THE INVENTION

The invention relates to a hydraulic assembly for generating brake pressure for a hydraulic motor vehicle brake system, in particular a master brake cylinder, and to a method for producing bore portions with a target diameter in a cavity of the hydraulic assembly.

BACKGROUND OF THE INVENTION

Hydraulic assemblies of said type are used widely and in diverse embodiments. In particular master brake cylinders of various kinds have a cavity which is normally formed as a blind bore in which one or multiple cylinder pistons are displaced axially, which pistons delimit in the cavity one or multiple pressure chambers which are filled with pressure liquid and in which brake pressure is generated because of the piston displacement.

In order to ensure correct functioning of the assembly, the cavity must have at least one bore portion with a target diameter of defined tolerance into which the cylinder piston is displaced in a sealed-off manner. Furthermore, for an intended durability, it is necessary for the inner wall of the cavity to have a defined minimum hardness and surface quality at least in portions on which a sealing element slides and/or which come into contact with the piston at least temporarily, in order to reduce wear and friction forces.

In most hydraulic assemblies of said type, the cavity is introduced into a main body composed of an aluminum alloy which has relatively low hardness.

In order to ensure the abovementioned requirements for the bore portion(s) in question in the cavity, it is known to form the cavity as a blind bore and, by way of a cutting manufacturing process—for example by way of drilling or milling—to firstly provide said cavity with a pre-drilling diameter which is smaller than the target diameter. Subsequently, the pre-drilling diameter is increased to the target diameter, likewise in a cutting manner, by way of reaming or honing, and in the process the tips, waves and ridges in the surface which arose from the previous machining are abraded and the roughness depth and roughness of the inner wall thus reduced. Afterwards, the cavity or the entire main body are provided by means of electrochemistry with a separate protective layer—for example are anodized or electrochemically oxidized. The main body has to be repeatedly washed or cleaned after the individual process steps in order to remove the chips, cooling lubricants or electrolytes.

SUMMARY OF THE INVENTION

It is felt that the production of the known assemblies has room for improvement with regard to the effort and the costs, and, moreover, an inner wall of the cavity can, as a result of the production methods for the main body, which are normally casting processes, have blowholes which have to be detected by the subsequent complex control measures and possibly increase the amount of rejects or entail costly rework.

An aspect of the invention is therefore based on providing a generic hydraulic assembly whose production is designed to be more effective and more economical and where the technical requirements nevertheless remain fulfilled.

An aspect of the invention provides that the material of the main body has in an edge layer of an inner wall of the cavity in the bore portion a material structure which has been hardened by deformation.

The bore portion of an assembly machined according to an aspect of the invention in this way has an inner wall with a surface which has been hardened and smoothed by deformation and which has an improved surface quality and reduced tolerances. Additionally, the material structure in a region close to the surface is homogenized and compacted, the traces of the cutting processes, such as machining tips or waves, being eliminated and/or smoothed. The pronounced edge layer strength due to the compaction of the material structure allows better wear behavior and therefore improved durability without it being necessary for an additional separate protective layer to be applied and without chemically aggressive media having to be used in the production process. The detachment of a protective layer is not possible in the absence thereof.

The compaction by deformation of the surface results in any blowholes collapsing and thus being reduced in number and volume, this reducing the amount of rejects and the effort in relation to controlling and rework.

The sliding behavior of the piston and/or of the sealing elements is improved, and it is possible for the friction and sealing gaps to be reduced and at the same time, as a result of the reduced Ra and Rz values, for the bearing line fraction to be increased, and the piston guidance can be optimized.

The increased wear resistance and reduced friction results in unwanted black discoloration of pressure medium being avoided or reduced.

One particularly advantageous embodiment of the invention provides that the bore portion is delimited axially by at least two radial grooves, and the sealing elements are arranged in the radial grooves, whereby the surface to be machined and the production effort are reduced.

According to a preferred refinement of the invention, the cavity has a second bore portion which has the target diameter and in which there is arranged a floating piston which is displaceable axially and which separates the first pressure chamber from a second pressure chamber in which brake pressure for a second brake circuit is generated. In particular, the assembly may be designed as a tandem-type master brake cylinder, whereby the hydraulic assembly according to the invention and the associated production method can be used without any problem in most motor vehicle brake systems.

According to another refinement, the cavity has in its axial profile, preferably between the first bore portion and the second bore portion, at least one portion with a radial dimension which is enlarged in comparison with the target diameter. This allows the surface to be machined to be reduced further and, as a result of enlarged through-flow cross sections, the circulation of the pressure medium inside the cavity to be improved considerably. This also allows the inner volume of one or multiple pressure chambers to be increased without the axial total length of the assembly having to be increased.

In order to optimize the production process and to improve the surface quality of the bore portions, the main body is, according to the invention, made from an aluminum alloy such that the latter has, at least in the region of the cavity outside the edge layer, a material hardness of less than 45 HRC and an elongation at break of more than 5%.

According to a preferred configuration according to an aspect of the invention, the edge layer has a thickness between 10 µm and 20 µm in the radial direction, which results in hardening and surface smoothing which are optimal in terms of operation being achieved with reduced deformation work effort.

For the optimized sliding behavior of the cylinder piston and/or the sealing elements, the inner wall is preferably brought to a roughness depth Rz<1 µm and a roughness Ra<1 µm at least in the bore portions.

Advantageously, in further embodiments, the assembly according to an aspect of the invention can be designed for example as an electrohydraulic brake unit, but also as a brake unit having an electromechanical boosting stage, whereby the production effort and costs of such brake units are reduced.

According to another embodiment according to the invention, it is possible for at least one dynamically stressed sealing element for sliding on the inner wall in the bore portion to be provided, whereby the sealing off of one or multiple displaceable pistons can also be realized as necessary by sealing elements arranged at the piston(s).

An aspect of the invention furthermore contains an advantageous method for producing the bore portions in a hydraulic assembly.

In particular, the method according to an aspect of the invention provides that, in a first process step, the cavity is pre-drilled with a pre-drilling diameter at least in bore portions which are provided for having the target diameter, which pre-drilling diameter is preferably smaller than the target diameter by between 15 µm and 20 µm. In this case, a drilling tool and drilling parameters by way of which the inner wall in bore portions has a roughness depth between 3 µm and 10 µm, preferably of 5 µm, after a single pass are preferably selected. This allows the cycle time to be reduced, and additionally manufacturing plants, already available, for conventional master brake cylinders can be used in a cost-effective manner.

According to a next process step of the method according to an aspect of the invention, the inner wall of the bore portions is deformed in one pass with the application of a radially outwardly directed force using a roller-burnishing tool until the inner wall has the target diameter and the roughness depth and the roughness are preferably below 1 µm.

For a particularly efficient deformation process, the invention in this case provides that the intended roller-burnishing speed is less than 200 m/min and is preferably set in a range between 100 m/min and 150 m/min, wherein the feed speed of the roller-burnishing tool is set in a range between 0.2 mm/rev and 0.6 mm/rev.

By applying the method according to an aspect of the invention, the cycle times in the production are reduced due to the reduction in the process steps, and the cleaning requirement and the amount of cooling lubricant used is reduced, and so the production is designed to be more economical.

The method according to an aspect of the invention is suitable both for assemblies in which one sealing element slides on an inner wall of the cavity, for example a central-valve-type master brake cylinder having sealing rings arranged on the pistons, and for assemblies in which sealing elements remain positionally fixed in the cavity and the piston slides thereon, for example the master brake cylinder of plunger type.

BRIEF DESCRIPTION OF THE DRAWINGS

Further features and advantages of aspects of the invention will emerge from the following description of an exemplary embodiment and from the drawings, in which.

DETAILED DESCRIPTION OF THE PREFERRED EMBODIMENTS

FIG. 1

Figure 1:
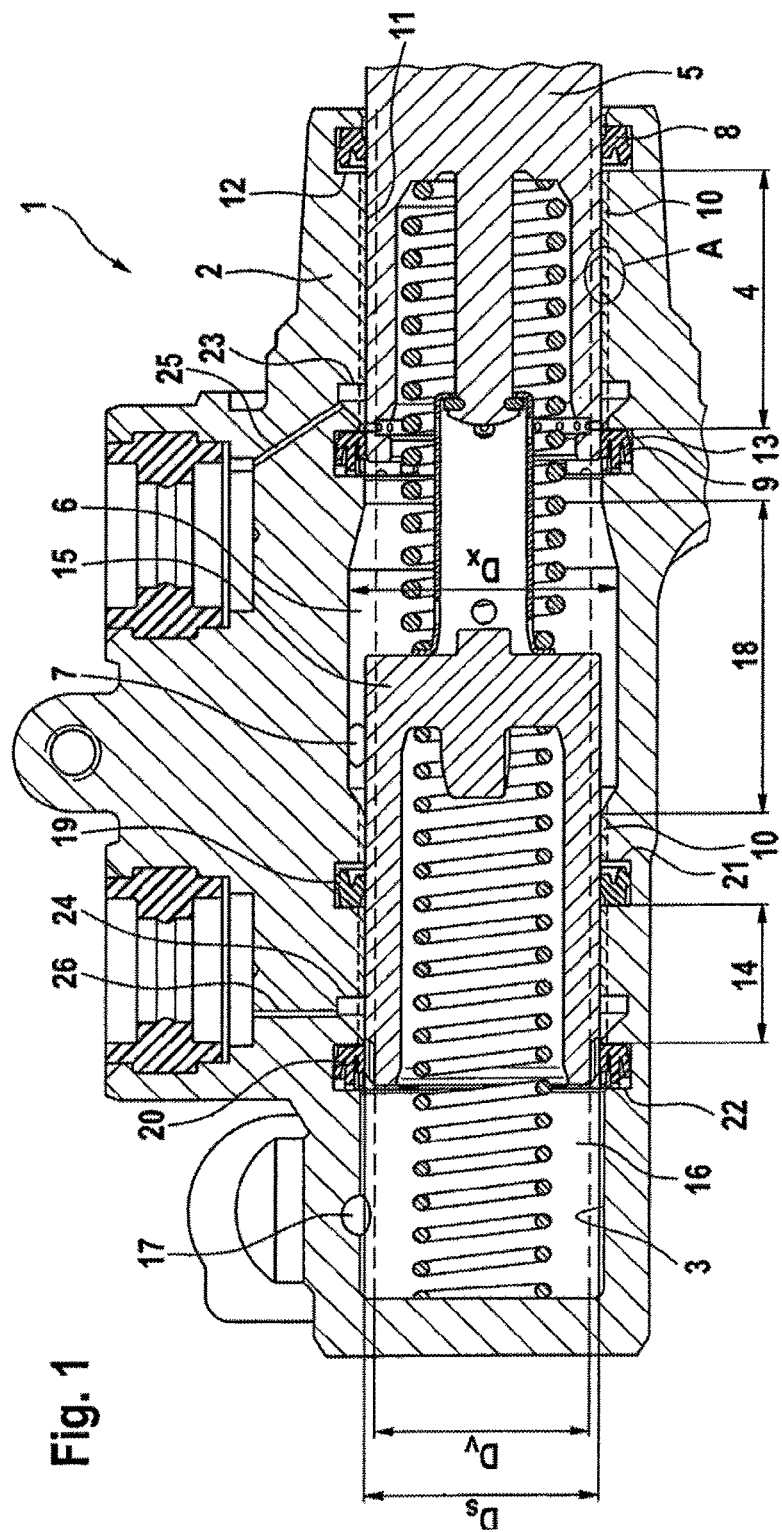
FIG. 1 shows an embodiment according to the invention of the brake unit in longitudinal section.
Figure 3:
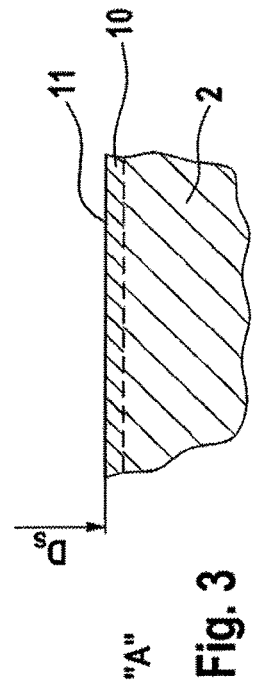
FIG. 3 shows the view as per FIG. 2 with the compacted edge layer.

FIG. 1 shows, in sectional illustration, a hydraulic assembly 1 according to an aspect of the invention using a plunger-type tandem master brake cylinder as an example.

A sack-shaped cavity 3 is arranged in the main body 2 which is composed of a lightweight metal alloy, preferably an aluminum alloy. The cavity 3 has a first bore portion 4 and a second bore portion 14, which each have a target diameter Ds which, in this exemplary embodiment, at the same time forms the smallest diameter in the axial profile of the cavity 3.

There is accommodated, in each case so as to be displaceable in the axial direction, a mechanically actuable cylinder piston 5 in the region of the bore portion 4, and a floating piston 15 in the region of the bore portion 14. The cylinder piston 5 delimits a first pressure chamber 6, which is filled with a hydraulic pressure medium and which is connected to a first brake circuit 7, and the floating piston 15 separates the pressure chamber 6 from a second pressure chamber 16, which is likewise filled with the hydraulic pressure medium and which is connected to a second brake circuit 17.

The bore portion 4 is delimited in the axial direction by two radial grooves 12,13 in which dynamically stressed sealing elements 8,9, which serve for sealing off with respect to the cylinder piston 5, are accommodated. Analogously, the bore portion 14 is arranged between radial grooves 21, 22 in which sealing elements 19, 20 for sealing with respect to the floating piston 15 are accommodated.

Provided between the bore portions 4 and 14 in the axial direction is a portion 18 whose radial dimension Dx is formed to be larger than the target diameter Ds.

Two replenishing passages 23, 24, which open into the bore portions 4 and 14 and which are connected to a pressure medium container (not shown) via connecting passages 25,26, supply the pressure chambers 6,16 with the hydraulic pressure medium.

Both those edges of the radial grooves 12, 13, 21, 22 which adjoin the bore portions 4, 14 and the transitions to the portion 18 are in this case of bevelled or rounded form.

The inner wall 11 of the cavity 3 has in the regions of the bore portions 4 and 14 a relatively thin edge layer 10 in which the material of the main body 2 is hardened.

The depth or the thickness of the edge layer 10 in the radial direction lies in a range between 10 µm and 20 µm and is preferably approximately 15 µm.

The hardening of the edge layer 10 is brought about as strain hardening by way of a deformation process, in particular roller burnishing. For this purpose, the cavity 3 is, in a first process step, at least in axial portions which enclose the bore regions 4 and 14, brought to a pre-drilling diameter Dv which is smaller in a defined manner than the target diameter Ds intended ultimately for the operation of the assembly 1. This preferably occurs in a single working process using a suitable drilling tool which creates the surface of the inner wall 11 with a defined roughness depth Rz.

FIG. 2

Figure 2:
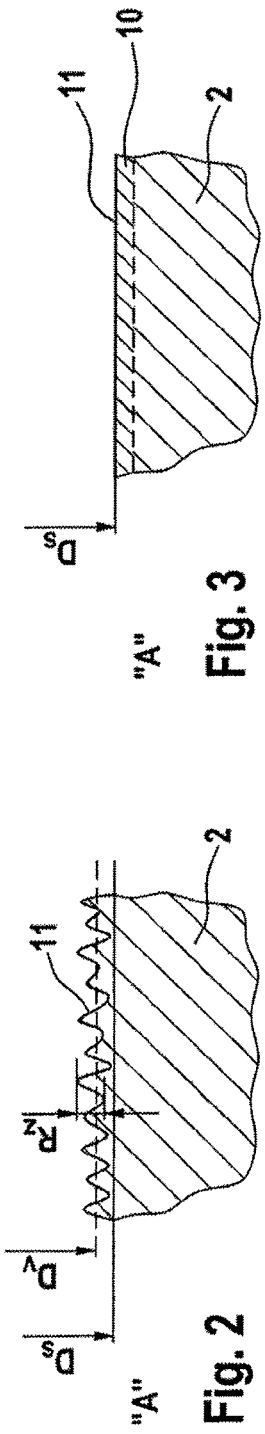
FIG. 2 shows an enlarged and highly simplified sectional view of a portion of the inner wall of the cavity in the bore portion as per FIG. 1 after the pre-drilling.

FIG. 2 shows an enlarged and highly simplified sectional view of a portion of the inner wall 11 of the cavity 3 in the bore portion 4 as per FIG. 1 after the pre-drilling.

For a particularly effective end result, it should be ensured in construction and process terms that the material of the main body 2 has, completely or at least in the region directly adjoining the cavity 3, a Rockwell hardness of less than 45 HRC and an elongation at break of more than 5% and is in principle able to be plastically deformed.

The surface of the inner wall 11 should in this case have an average roughness depth Rz which lies in a range between 3 µm and 10 µm. Preferably, the roughness depth Rz should be approximately 5 µm, wherein the pre-drilling diameter Dv is in this case preferably selected to be smaller than the target diameter by approximately 20 µm.

FIG. 3

In a subsequent process step, the inner wall 11 is widened radially outwardly using a roller-burnishing tool (not shown) until the target diameter Ds is reached, preferably in a single process step. The unevennesses, shown in simplified form in FIG. 2 and defining the roughness depth Rz, of the surface of the inner wall 11 are in the process displaced radially outward from their previous position, with the result that an edge layer 10, in which the material of the main body 2 is compacted and hardened, is formed on the inner wall 11. At the same time, the surface of the inner wall 11 is also significantly smoothed and preferably has in the end product both a roughness depth Rz and a roughness Ra less than 1 µm.

For optimal target attainment within the context of the technical object, a thickness or depth of the edge layer 10 in the radial direction in a range between 10 µm and 20 µm, and preferably 15 µm, proves to be particularly advantageous. This thickness can be achieved in a particularly simple manner in particular by maintaining the above-described parameters and material properties.

Preferably, the roller-burnishing speed should in this case be between 100 and 150 m/min, and the feed speed of the roller-burnishing tool between 0.2 mm/rev and 0.6 mm/rev.

LIST OF REFERENCE SIGNS

1 Hydraulic assembly
2 Main body
3 Cavity
4 Bore portion with Ds
5 Cylinder piston
6 Pressure chamber
7 Brake circuit
8 Sealing element
9 Sealing element
10 Edge layer
11 Inner wall
12 Radial groove
13 Radial groove
14 Bore portion with Ds
15 Floating piston
16 Pressure chamber
17 Brake circuit
18 Portion with Dx
19 Sealing element
20 Sealing element
21 Radial groove
22 Radial groove
23 Replenishing passage
24 Replenishing passage
25 Connecting passage
26 Connecting passage
Ds Target diameter
Dv Pre-drilling diameter
Dx Enlarged radial dimension

The invention claimed is:

1. A hydraulic assembly for generating brake pressure for a hydraulic motor vehicle brake system, comprising a main body, comprising a cavity which is arranged in the main body and which has at least a first bore portion which has a defined target diameter and in which there is arranged a cylinder piston which is displaceable in the axial direction and which, in the cavity, delimits at least one pressure chamber which is filled with a hydraulic pressure medium and which serves for generating brake pressure, comprising at least one first and one second sealing element which serve for sealing off the cylinder piston and which are arranged axially spaced apart from one another, wherein the material of the main body has in an edge layer of an inner wall of the cavity in the bore portion a material structure which has been hardened by deformation and a roughness depth Rz<1 µm and a roughness Ra<1 µm.

2. The hydraulic assembly as claimed in claim 1, wherein the first bore portion is delimited axially by at least two radial grooves, and the sealing elements are arranged in the radial grooves.

3. The hydraulic assembly as claimed in claim 1, wherein the cavity has a second bore portion which has the target diameter and in which there is arranged a floating piston which is displaceable axially and which separates the first pressure chamber from a second pressure chamber in which brake pressure is generated.

4. The hydraulic assembly as claimed in claim 1, wherein the cavity has in its axial profile at least one portion with a radial dimension which is enlarged in comparison with the target diameter.

5. The hydraulic assembly as claimed in claim 3, wherein the at least one portion is arranged between the first bore portion and the second bore portion in the axial direction.

6. A hydraulic assembly for generating brake pressure for a hydraulic motor vehicle brake system, comprising a main body, comprising a cavity which is arranged in the main body and which has at least a first bore portion which has a defined target diameter and in which there is arranged a cylinder piston which is displaceable in the axial direction and which, in the cavity, delimits at least one pressure chamber which is filled with a hydraulic pressure medium and which serves for generating brake pressure, comprising at least one first and one second sealing element which serve for sealing off the cylinder piston and which are arranged axially spaced apart from one another, wherein the material of the main body has in an edge layer of an inner wall of the cavity in the bore portion a material structure which has been hardened by deformation, and wherein the main body is made from an aluminum alloy which has, at least in the region of the cavity outside the edge layer, a material hardness of less than 45 HRC (Rockwell hardness) and an elongation at break of more than 5%.

7. A hydraulic assembly for generating brake pressure for a hydraulic motor vehicle brake system, comprising a main body, comprising a cavity which is arranged in the main body and which has at least a first bore portion which has a defined target diameter and in which there is arranged a cylinder piston which is displaceable in the axial direction and which, in the cavity, delimits at least one pressure chamber which is filled with a hydraulic pressure medium and which serves for generating brake pressure, comprising at least one first and one second sealing element which serve for sealing off the cylinder piston and which are arranged axially spaced apart from one another, wherein the material of the main body has in an edge layer of an inner wall of the cavity in the bore portion a material structure which has been hardened by deformation, and wherein the edge layer has a thickness between 10 μm and 20 μm in the radial direction.

8. A hydraulic assembly for generating brake pressure for a hydraulic motor vehicle brake system, comprising a main body, comprising a cavity which is arranged in the main body and which has at least a first bore portion which has a defined target diameter and in which there is arranged a cylinder piston which is displaceable in the axial direction and which, in the cavity, delimits at least one pressure chamber which is filled with a hydraulic pressure medium and which serves for generating brake pressure, comprising at least one first and one second sealing element which serve for sealing off the cylinder piston and which are arranged axially spaced apart from one another, wherein the material of the main body has in an edge layer of an inner wall of the cavity in the bore portion a material structure which has been hardened by deformation, and wherein the inner wall is uncoated at least in the bore portions.

9. The hydraulic assembly as claimed in claim 1, wherein the assembly is a tandem-type master brake cylinder.

10. The hydraulic assembly as claimed in claim 1, wherein the assembly is an electrohydraulic brake unit.

11. The hydraulic assembly as claimed in claim 1, wherein the assembly is a brake unit having an electromechanical boosting stage.

12. The hydraulic assembly as claimed in claim 1, further comprising at least one dynamically stressed sealing element for sliding on the inner wall in the first bore portion.

13. The hydraulic assembly as claimed in claim 1, wherein the cylinder piston for generating brake pressure is mechanically actuable.

14. A method for producing at least one bore portion in a hydraulic assembly for generating brake pressure for a hydraulic motor vehicle brake system, the assembly comprising a main body, comprising a cavity which is arranged in the main body and which has at least a first bore portion which has a defined target diameter and in which there is arranged a cylinder piston which is displaceable in the axial direction and which, in the cavity, delimits at least one pressure chamber which is filled with a hydraulic pressure medium and which serves for generating brake pressure, comprising at least one first and one second sealing element which serve for sealing off the cylinder piston and which are arranged axially spaced apart from one another, wherein the material of the main body has in an edge layer of an inner wall of the cavity in the bore portion a material structure which has been hardened by deformation, the method comprising:
pre-drilling the cavity with a pre-drilling diameter (Dv) in the bore portions which are provided for having the target diameter, wherein the pre-drilling diameter is smaller than the target diameter by between 15 μm and 20 μm, and the inner wall in the bore portions has a roughness depth between 3 μm<Rz<10 μm after the pre-drilling,
deforming the inner wall of the bore portions in one pass with the application of a radially outwardly directed force using a roller-burnishing tool until the inner wall has the target diameter, the roughness depth Rz<1 μm, the roughness Ra<1 μm.

15. The method as claimed in claim 14 wherein the set roller-burnishing speed is less than 200 m/min and, wherein the feed speed of the roller-burnishing tool is set in a range between 0.2 mm/rev and 0.6 mm/rev.

16. The hydraulic assembly as claimed in claim 4, wherein the at least one portion is arranged between the first bore portion and the second bore portion in the axial direction.

17. The method for producing at least one bore portion in a hydraulic assembly as claimed in claim 14 wherein the roughness depth of the bore portions is 5 μm after the predrilling.

18. The method as claimed in claim 14, wherein the set roller-burnishing speed is set in a range between 100 m/min and 150 m/min, and wherein the feed speed of the roller-burnishing tool is set in a range between 0.2 mm/rev and 0.6 mm/rev.

* * * * *